United States Patent
Krabbenborg

(10) Patent No.: US 8,674,022 B2
(45) Date of Patent: *Mar. 18, 2014

(54) POLYOLEFIN ELASTOMER COMPOSITION FOR ARTIFICIAL LEATHER APPLICATIONS

(75) Inventor: Franciscus J. T. Krabbenborg, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/696,809

(22) PCT Filed: Sep. 10, 2010

(86) PCT No.: PCT/US2010/048330
§ 371 (c)(1),
(2), (4) Date: Nov. 8, 2012

(87) PCT Pub. No.: WO2011/155956
PCT Pub. Date: Dec. 15, 2011

(65) Prior Publication Data
US 2013/0072623 A1     Mar. 21, 2013

Related U.S. Application Data

(60) Provisional application No. 61/352,421, filed on Jun. 8, 2010.

(51) Int. Cl.
| | | |
|---|---|---|
| C08L 23/08 | (2006.01) | |
| C08L 23/10 | (2006.01) | |
| C08F 297/08 | (2006.01) | |
| C08F 210/16 | (2006.01) | |
| B32B 27/12 | (2006.01) | |
| D06N 3/04 | (2006.01) | |
| D06N 3/00 | (2006.01) | |

(52) U.S. Cl.
USPC ............... 525/88; 525/240; 526/65; 526/348; 427/447; 427/155; 427/326; 427/327.4; 428/523

(58) Field of Classification Search
USPC ............... 525/88, 240; 526/65, 348; 427/447, 427/155, 326, 374.1; 428/523
See application file for complete search history.

(56) References Cited

U.S. PATENT DOCUMENTS

2012/0172534 A1*    7/2012    Krabbenborg ............... 525/240

* cited by examiner

*Primary Examiner* — Nathan M Nutter

(57) ABSTRACT

The present invention relates to a thermoplastic polyolefin elastomer composition in powder form comprising (i) an olefin block copolymer or (ii) a substantially linear ethylene polymer and/or a linear ethylene polymer and propylene polymer blend. Said composition demonstrates good pulverizing and flow characteristics at ambient temperature. In another aspect, this invention relates to a process for preparing said thermoplastic polyolefin elastomer powder and applications for using said powder. In a further aspect, this invention relates to paper transfer molding said thermoplastic polyolefin elastomer composition into artificial leather, particularly for skins for automotive interior applications such as instrument panels.

6 Claims, No Drawings

US 8,674,022 B2

POLYOLEFIN ELASTOMER COMPOSITION FOR ARTIFICIAL LEATHER APPLICATIONS

CROSS REFERENCE STATEMENT

This application claims benefit of U.S. Provisional Application No. 61/352,421, filed Jun. 8, 2010, which is incorporated herein by reference.

FIELD OF THE INVENTION

The present invention relates to a thermoplastic polyolefin elastomer composition in powder form comprising an olefin block copolymer or a substantially linear ethylene polymer and/or a linear ethylene polymer and propylene polymer blend for use in artificial leather applications, specifically for automotive seat coverings and skins for interior trim applications. The invention further relates to a process to make articles comprising artificial leather skins of said composition by a paper transfer processes.

BACKGROUND OF THE INVENTION

In recent years, artificial leather which is a natural leather substitute has been widely used in the field of garments, shoe uppers, handbags, gloves, sports equipment, and upholstery for use in furniture and automotive seats and trim applications. The property requirements for artificial leathers vary depending on the application and kind of fabrication. Generally, artificial leathers are coated fabrics. The production of coated fabrics is well known; one or more coating-agent is applied to a fabric substrate using either a direct coating process or a transfer process.

Direct processes include the application of a coating-agent as a solution or suspension in an organic solvent such as dimethylformamide (DMF), tetrahydrofuran (THF), or dimethylsulfoxide (DMSO). The coating-agent is applied to and impregnates the surface of a fabric. Suitable fabrics can be woven, non-woven, knitted, twilled, sweating, or the like. The impregnated fabric is heated, the coating-agent cures, and the solvent evaporated. However, this process provides a flat non-attractive surface lacking any three-dimensional "grain-like" feeling. Furthermore, the evaporation of the solvents creates environmentally undesirable volatile organic compounds (VOCs).

A common direct transfer process utilizes a release paper sometimes known as film casting paper and is referred to as a paper transfer process. The use of such release paper is an established procedure. It has a release surface, smooth or carrying a negative or reverse of a pastern (emboss) required in the final artificial leather. The release paper is usually used by extruding onto the release surface a coating-agent which will cure when heated to form the artificial leather surface. The coated release paper is then laminated, typically by heat and/or pressure, to a base fabric. The polymer impregnates the fabric and after cooling the release paper is stripped from the surface polymer revealing a smooth surface or, where present, the positive of the emboss.

A common type of coating-agent is a plastisol or organosol. Plastisol or organosol generally refer to dispersions of fine plastic particles in softeners, sometimes referred to as plasticizers, which harden or gelate when heated to high temperatures. The plastic particles typically comprise polyvinyl chloride-vinyl acetate copolymer (PVC/PVAc), polymethyl methacrylate (PMMA), and polyalkyl methacrylate (PAMA) such as polymethyl methacrylate copolymers, and most commonly polyvinyl chloride (PVC). Phthalic acid esters are most commonly used softeners. Plastisol or organosol may further contain other ingredients depending on the specific end-use application.

While plastisol and organosol coating-agents have enjoyed wide-scale use, they suffer from many draw backs, especially in interior automotive applications. For instance, their heat properties are marginal and, over time, the softeners bleed resulting in a reduction of the artificial leather's properties, such as decreased durability and strength. Further, the softeners may cause undesirable odors as well as a film build-up on the inside of the windows.

There are other polymeric resins used as coating-agents, such as amino acid resins, nylon resins, and most frequently polyurethane resins. While the use of these resins eliminate the problems created from the bleeding of the plasticizers used in PVC plastisols, the artificial leather produced from these resins have inferior surface strength and it is technically difficult to achieve the desired thick feel to the artificial leather.

Thus, there is a need, especially by the automobile manufacturers, for an improved polymer composition and process to produce artificial leather for automotive seat and interior trim applications; in particularly, a polymer composition that easily lends itself for use in paper transfer processes while reducing, or preferably eliminating, VOCs, provides improved heat properties, reduces or eliminates bleeding, and exhibits good long term physical properties in the final artificial leather application.

SUMMARY OF THE INVENTION

The thermoplastic polyolefin composition of the present invention is such a composition and it is well-suited for use in paper transfer processes.

In one embodiment, the thermoplastic polyolefin composition of the present invention comprises one or more polymeric materials comprising one or more soft segment and one or more hard segment, said composition is for application to a release paper to form a supported or unsupported artificial leather wherein said composition has a Shore A hardness greater than 75, a Tg less than −45° C., and a distinct melting peak greater than 95° C. as determined by DSC.

In another embodiment, the thermoplastic polyolefin composition of the present invention comprises:

(i) an olefin block copolymer, comprising one or more hard segment and one or more soft segment and characterized by one or more of the aspects described as follows:

(i.a) has a weight average molecular weight/number average molecular weight ratio (Mw/Mn) from about 1.7 to about 3.5, at least one melting peak (Tm) in degrees Celsius, and a density (d) in grams/cubic centimeter (g/cc), wherein the numerical values of Tm and d correspond to the relationship:

$T_m > -2002.9 + 4538.5(d) - 2422.2(d)^2$ or $T_m > -6553.3 + 13735(d) - 7051.7(d)^2$; or (i.b) has a Mw/Mn from about 1.7 to about 3.5, and is characterized by a heat of fusion (ΔH) J/g and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships:

$\Delta T > -0.1299(\Delta H) + 62.81$ for $\Delta H$ greater than zero and up to 130 J/g, $\Delta T \geq 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase: Re>1481−1629(d); or (i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (i.g) has an average block index greater than zero and up to about 1.0 and a molecular weight distribution, Mw/Mn, greater than about 1.3.

In another embodiment of the present invention, the thermoplastic polyolefin composition comprises a blend of (ii) a linear ethylene polymer, a substantially linear ethylene polymer, or mixtures thereof characterized as having (ii.a) a density of less than about 0.93 g/cm$^3$, (ii.b) a molecular weight distribution, $M_w/M_n$, of less than about 3.0, and (ii.c) a Composition Distribution Branch Index of greater than 30 percent;

and (iii) a propylene polymer having a crystallinity equal to or greater than 30 percent.

In a preferred embodiment, the thermoplastic polyolefin composition disclosed herein above is obtained by pulverizing said thermoplastic polyolefin composition at ambient temperature.

In yet another embodiment, the present invention is a process for the production of a supported artificial leather using the composition of Claim 1 comprising the steps of: (a) forming said composition into a powder, (b) coating a release paper with said powder, (c) heating said coating to form a continuous polymeric layer, (d) applying a fabric to heated continuous polymeric layer forming a fabric/polymeric layer composite, (e) applying pressure to the heated fabric/polymeric layer composite, (f) cooling said fabric/polymeric composite layer, and (g) stripping the release paper from the continuous polymeric layer forming an artificial leather.

In yet another embodiment, the present invention is a process for the production of an unsupported artificial leather using the composition of claim 1 comprising the steps of: (a) forming said composition into a powder, (b) coating a release paper with said powder, (c) heating said coating to form a continuous polymeric layer, (f) cooling said polymeric layer, and (g) stripping the release paper from the continuous polymeric layer forming an artificial leather.

In yet another embodiment, the present invention is a supported or unsupported artificial leather comprising thermoplastic polyolefin composition disclosed herein above, preferably an unsupported artificial leather for a seat covering, an instrument panel, a console box, an arm rest, a head rest, a door trim, a rear panel, a pillar trim, a sunvisor, a trunk room trim, a trunk lid trim, an air bag cover, a seat buckle, a head liner, a gloves box, or a steering wheel cover.

DETAILED DESCRIPTION OF THE INVENTION

The thermoplastic polyolefin composition of the present invention comprises an elastomeric component, sometimes referred to as a soft segment, and a crystalline component, sometimes referred to as a hard segment. The thermoplastic polyolefin composition of the present invention may comprise two polymeric materials, for example, an elastomeric polymer and a crystalline polymer. Preferably, the thermoplastic polyolefin of the present invention comprises a single polymeric material that comprises therein one or more elastomeric or "soft" segment and one or more crystalline or "hard" segment.

Component (i) of the thermoplastic polyolefin composition of the present invention is an olefin block copolymer (OBC). The term "ethylene/alpha-olefin interpolymer" generally refers to polymers comprising ethylene and an alpha-olefin having 3 or more carbon atoms, such as propylene or other $C_4$ to $C_{20}$ alpha-olefins. Preferred alpha-olefins are propylene, 1-butene, 1-pentene, 1-hexene, 1-heptene, 1-decene, 1-dodecene, and most preferred is 1-octane. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an alpha-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer.

The term "multi-block copolymer" refers to a polymer comprising two or more chemically distinct regions or segments (also referred to as "blocks") preferably joined in a linear manner, that is, a polymer comprising chemically differentiated units which are joined end-to-end with respect to polymerized ethylenic functionality, rather than in pendent or grafted fashion. In a preferred embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or $M_w/M_n$), block length distribution, and/or block number distribution due to the unique process making of the copolymers. More specifically, when produced in a continuous process, the polymers desirably possess PDI from about 1.7 to about 8, preferably from about 1.7 to about 3.5, more preferably from about 1.7 to about 2.5, and most preferably from about 1.8 to about 2.5 or from about 1.8 to about 2.1. When produced in a batch or semi-batch process, the polymers possess PDI from about 1.0 to about 2.9, preferably from about 1.3 to about 2.5, more preferably from about 1.4 to about 2.0, and most preferably from about 1.4 to about 1.8. It is noted that "block(s)" and "segment(s)" are used herein interchangeably.

The olefin block copolymers (i) of the present invention are an alpha-olefin interpolymer, specifically an alpha-olefin block copolymer comprising one or more hard segment and one or more soft segment and characterized by one or more of the aspects described as follows:

(i.a) has a weight average molecular weight/number average molecular weight ratio ($M_w/M_n$) from about 1.7 to about 3.5, at least one melting point ($T_m$) in degrees Celsius (° C.), and a density (d) in grams/cubic centimeter (g/cc), wherein the numerical values of Tm and d correspond to the relationship:

$$T_m > -2002.9 + 4538.5(d) - 2422.2(d)^2 \text{ or } T_m > -6553.3 + 13735(d) - 7051.7(d)^2; \text{ or}$$

(i.b) has a $M_w/M_n$ from about 1.7 to about 3.5, and is characterized by a heat of fusion (ΔH) in Jules per gram (J/g) and a delta quantity, ΔT, in degrees Celsius defined as the temperature difference between the tallest differential scanning calorimetry (DSC) peak and the tallest crystallization analysis fractionation (CRYSTAF) peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase:

$$Re > 1481 - 1629(d); \text{ or}$$

(i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, $M_w/M_n$, greater than about 1.3; or (i.g) has an average block index greater than zero and up to about 1.0 and a molecular weight distribution, $M_w/M_n$, greater than about 1.3.

Processes for making the ethylene/alpha-olefin interpolymers have been disclosed in, for example, the following patent applications and publications: U.S. Provisional Application Nos. 60/553,906, filed Mar. 17, 2004; 60/662,937, filed Mar. 17, 2005; 60/662,939, filed Mar. 17, 2005; 60/566, 2938, filed Mar. 17, 2005; PCT Application Nos. PCT/US2005/008916, filed Mar. 17, 2005; PCT/US2005/008915, filed Mar. 17, 2005; PCT/US2005/008917, filed Mar. 17, 2005; WO 2005/090425, published Sep. 29, 2005; WO 2005/090426, published Sep. 29, 2005; and WO 2005/090427, published Sep. 29, 2005, all of which are incorporated by reference herein in their entirety. For example, one such method comprises contacting ethylene and optionally one or more addition polymerizable monomers other than ethylene under addition polymerization conditions with a catalyst composition comprising the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

The following test methods are used to characterize the olefin block copolymers of the present invention and are discussed in further detail in U.S. Pat. No. 7,355,089 and USP Publication No. 2006/0199930:

"Standard CRYSTAF method" or crystallization analysis fractionation is used to determine branching distributions. CRYSTAF is determined using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

"Flexural/Secant Modulus/Storage Modulus" samples are compression molded using ASTM D 1928. Flexural and 2 percent secant moduli are measured according to ASTM D-790. Storage modulus is measured according to ASTM D 5026-01 or equivalent technique.

"Melt Index" or $I_2$, is measured in accordance with ASTM D 1238, Condition 190° C./2.16 kg. Melt index, or $I_{10}$ is also measured in accordance with ASTM D 1238, Condition 190° C./10 kg. A useful value for comparison is the ratio $I_{10}/I_2$.

"DSC Standard Method" or Differential Scanning calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Calibration of the DSC is done as follows. First, a baseline is obtained by running a DSC from −90° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C. per minute. The heat of fusion (ΔH) and the onset of melting of the indium sample are determined and checked to be within 0.5° C. from 156.6° C. for the onset of melting and within 0.5 J/g from 28.71 J/g for the of fusion. Then deionized water is analyzed by cooling a small drop of fresh sample in the DSC pan from 25° C. to −30° C. at a cooling rate of 10° C. per minute. The sample is kept isothermally at −30° C. for 2 minutes and heat to 30° C. at a heating rate of 10° C. per minute. The onset of melting is determined and checked to be within 0.5° C. from 0° C.

The observed heat of fusion ($\Delta H_{observed}$) for the second scan is recorded. The observed heat of fusion is related to the degree of crystallinity in weight percent based on the weight of the OBC sample by the following equation:

$$\text{Crystallinity } \% = \frac{\Delta H_{observed}}{\Delta H_{theoretical\ Pe}} \times 100$$

where the heat of fusion for isotactic polypropylene ($\Delta H_{theoretical\ PE}$), as reported in B. Wunderlich, Macromolecular Physics, Volume 3, Crystal Melting, Academic Press, New Your, 1980, is 292 J/g of polymer.

"GPC Method" is gel permeation chromatographic for molecular weight determinations. The system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polyethylene}=0.431(M_{polystyrene})$.

Polyethylene equivalent molecular weight calculations are performed using Viscotek TriSEC software Version 3.0.

"Density" measurement samples are prepared according to ASTM D 1928. Measurements are made within one hour of sample pressing using ASTM D792, Method B.

"ATREF" is analytical temperature rising elution fractionation analysis and is conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

"$^{13}$C NMR Analysis" samples are prepared by adding approximately 3 g of a 50/50 mixture of tetrachloroethane-$d^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

"Mechanical Properties—Tensile, Hysteresis, and Tear", stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\epsilon_f$ is the strain taken for cyclic loading and $\epsilon_s$ is the strain where the load returns to the baseline during the $1^{st}$ unloading cycle.

"Block Index" of the ethylene/α-olefin interpolymers is characterized by an average block index (ABI) which is greater than zero and up to about 1.0 and a molecular weight distribution, $M_w/M_n$, greater than about 1.3. The ABI is the weight average of the block index (BI) for each of the polymer fractions obtained in preparative TREF (fractionation of a polymer by Temperature Rising Elution Fractionation) from 20° C. and 110° C., with an increment of 5° C. (although other temperature increments, such as 1° C., 2° C., 10° C., also can be used):

$$ABI=\Sigma(w_i BI_i)$$

where $BI_i$ is the block index for the ith fraction of the inventive ethylene/α-olefin interpolymer obtained in preparative TREF, and $w_i$ is the weight percentage of the ith fraction. Similarly, the square root of the second moment about the mean, hereinafter referred to as the second moment weight average block index, can be defined as follows:

$$2^{nd} \text{ moment weight average } BI = \sqrt{\frac{\Sigma(w_i(BI_i - ABI)^2)}{\frac{(N-1)\Sigma w_i}{N}}}$$

where N is defined as the number of fractions with $BI_i$ greater than zero. BI is defined by one of the two following equations (both of which give the same BI value):

$$BI = \frac{1/T_X - 1/T_{XO}}{1/T_A - 1/T_{AB}}$$

or $$BI = -\frac{LnP_X - LnP_{XO}}{LnP_A - LnP_{AB}}$$

where $T_X$ is the ATREF (analytical TREF) elution temperature for the ith fraction (preferably expressed in Kelvin), $P_X$ is the ethylene mole fraction for the ith fraction, which can be measured by NMR or IR as described below. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As an approximation or for polymers where the "hard segment" composition is unknown, the $T_A$ and $P_A$ values are set to those for high density polyethylene homopolymer.

$T_{AB}$ is the ATREF elution temperature for a random copolymer of the same composition (having an ethylene mole fraction of $P_{AB}$) and molecular weight as the inventive copolymer. $T_{AB}$ can be calculated from the mole fraction of ethylene (measured by NMR) using the following equation:

$$Ln P_{AB} = \alpha/T_{AB} + \beta$$

where α and β are two constants which can be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. Random ethylene copolymers and/or preparative TREF fractions of random copolymers satisfy the following relationship:

$$Ln P = -237.83/T_{ATREF} + 0.639$$

The above calibration equation relates the mole fraction of ethylene, P, to the analytical TREF elution temperature, $T_{ATREF}$, for narrow composition random copolymers and/or preparative TREF fractions of broad composition random copolymers. $T_{XO}$ is the ATREF temperature for a random copolymer of the same composition (i.e., the same comonomer type and content) and the same molecular weight and having an ethylene mole fraction of $P_X$. $T_{XO}$ can be calculated from $LnPX = \alpha/T_{XO} + \beta$ from a measured $P_X$ mole fraction. Conversely, $P_{XO}$ is the ethylene mole fraction for a random copolymer of the same composition (i.e., the same comonomer type and content) and the same molecular weight and having an ATREF temperature of $T_X$, which can be calculated from $Ln P_{XO} = \alpha/T_X + \beta$ using a measured value of $T_X$. Once the block index (BI) for each preparative TREF fraction is obtained, the weight average block index, ABI, for the whole polymer can be calculated. Determination of Block Index is also described in US Patent Application Publication No. 2006-019930, which is herein incorporated by reference.

The olefin block copolymers of the present invention have a block index (weight averaged) greater than zero and up to about 1.0, preferably from 0.15 to 0.8, more preferably from 0.2 to 0.7, even more preferably from 0.4 to 0.6.

Component (ii) in the compositions of this invention comprises one or more substantially linear ethylene polymer or one or more linear ethylene polymer (S/LEP), or a mixture thereof. Both substantially linear ethylene polymers and linear ethylene polymers are known. Substantially linear ethylene polymers and their method of preparation are fully described in U.S. Pat. No. 5,272,236 and U.S. Pat. No. 5,278,272. Linear ethylene polymers and their method of preparation are fully disclosed in U.S. Pat. No. 3,645,992; U.S. Pat. No. 4,937,299; U.S. Pat. No. 4,701,432; U.S. Pat. No. 4,937,301; U.S. Pat. No. 4,935,397; U.S. Pat. No. 5,055,438; EP 129,368; EP 260,999; and WO 90/07526. For example, such polymers are available commercially under the trade names ENGAGE™ polyolefin elastomers and AFFINITY™ polyolefin plastomers from The Dow Chemical Company, EXACT™ polyolefin elastomers from ExxonMobil, and TAFMER™ polyolefin elastomers from Mitsui.

Suitable S/LEP comprises one or more $C_2$ to $C_{20}$ alpha-olefins in polymerized form, having a $T_g$ less than 25° C., preferably less than 0° C., most preferably less than −25° C. Examples of the types of polymers from which the present S/LEP are selected include copolymers of alpha-olefins, such as ethylene and propylene, ethylene and 1-butene, ethylene and 1-hexene or ethylene and 1-octene copolymers, and terpolymers of ethylene, propylene and a diene comonomer such as hexadiene or ethylidene norbornene.

As used here, "a linear ethylene polymer" means a homopolymer of ethylene or a copolymer of ethylene and one or more alpha-olefin comonomers having a linear backbone (i.e. no cross linking), no long-chain branching, a narrow molecular weight distribution and, for alpha-olefin copolymers, a narrow composition distribution. Further, as used here, "a substantially linear ethylene polymer" means a homopolymer of ethylene or a copolymer of ethylene and of one or more alpha-olefin comonomers having a linear backbone, a specific and limited amount of long-chain branching, a narrow molecular weight distribution and, for alpha-olefin copolymers, a narrow composition distribution.

Short-chain branches in a linear copolymer arise from the pendent alkyl group resulting upon polymerization of intentionally added $C_3$ to $C_{20}$ alpha-olefin comonomers. Narrow composition distribution is also sometimes referred to as homogeneous short-chain branching. Narrow composition distribution and homogeneous short-chain branching refer to the fact that the alpha-olefin comonomer is randomly distributed within a given copolymer of ethylene and an alpha-olefin comonomer and virtually all of the copolymer molecules have the same ethylene to comonomer ratio. The narrowness of the composition distribution is indicated by the value of the Composition Distribution Branch Index (CDBI) or sometimes referred to as Short Chain Branch Distribution Index. CDBI is defined as the weight percent of the polymer molecules having a comonomer content within 50 percent of the median molar comonomer content. The CDBI is readily calculated, for example, by employing temperature rising elution fractionation, as described in Wild, Journal of Polymer Science, Polymer Physics Edition, Volume 20, page 441 (1982), or U.S. Pat. No. 4,798,081. The CDBI for the substantially linear ethylene copolymers and the linear ethylene copolymers in the present invention is greater than about 30 percent, preferably greater than about 50 percent, and more preferably greater than about 90 percent.

Long-chain branches in substantially linear ethylene polymers are polymer branches other than short chain branches. Typically, long chain branches are formed by insitu generation of an oligomeric alpha-olefin via beta-hydride elimination in a growing polymer chain. The resulting species is a relatively high molecular weight vinyl terminated hydrocarbon which upon polymerization yields a large pendent alkyl group. Long-chain branching may be further defined as hydrocarbon branches to a polymer backbone having a chain length greater than n minus 2 ("n–2") carbons, where n is the number of carbons of the largest alpha-olefin comonomer intentionally added to the reactor. Preferred long-chain branches in homopolymers of ethylene or copolymers of ethylene and one or more $C_3$ to $C_{20}$ alpha-olefin comonomers have at least from 20 carbons up to more preferably the number of carbons in the polymer backbone from which the branch is pendent. Long-chain branching may be distinguished using $^{13}C$ nuclear magnetic resonance spectroscopy alone, or with gel permeation chromatography-laser light scattering (GPC-LALS) or a similar analytical technique. Substantially linear ethylene polymers contain at least 0.01 long-chain branches/1000 carbons and preferably 0.05 long-chain branches/1000 carbons. In general, substantially linear ethylene polymers contain less than or equal to 3 long-chain branches/1000 carbons and preferably less than or equal to 1 long-chain branch/1000 carbons.

Preferred substantially linear ethylene polymers are prepared by using metallocene based catalysts, sometimes referred to as constrained geometry catalyst (CGC), capable of readily polymerizing high molecular weight alpha-olefin copolymers under the process conditions. As used here, copolymer means a polymer of two or more intentionally added comonomers, for example, such as might be prepared by polymerizing ethylene with at least one other $C_3$ to $C_{20}$ comonomer. Preferred linear ethylene polymers may be prepared in a similar manner using, for instance, metallocene or vanadium based catalyst under conditions that do not permit polymerization of monomers other than those intentionally added to the reactor. Other basic characteristics of substantially linear ethylene polymers or linear ethylene polymers include a low residuals content (i.e. a low concentration therein of the catalyst used to prepare the polymer, unreacted comonomers and low molecular weight oligomers made during the course of the polymerization), and a controlled molecular architecture which provides good processability even though the molecular weight distribution is narrow relative to conventional olefin polymers.

While the substantially linear ethylene polymers or the linear ethylene polymers used in the practice of this invention include substantially linear ethylene homopolymers or linear ethylene homopolymers, preferably the substantially linear ethylene polymers or the linear ethylene polymers comprise between about 50 to about 95 weight percent ethylene and about 5 to about 50, and preferably about 10 to about 25 weight percent of at least one alpha-olefin comonomer. The comonomer content in the substantially linear ethylene polymers or the linear ethylene polymers is generally calculated based on the amount added to the reactor and as can be measured using infrared spectroscopy according to ASTM D-2238, Method B. Typically, the substantially linear ethylene polymers or the linear ethylene polymers are copolymers of ethylene and one or more $C_3$ to $C_{20}$ alpha-olefins, preferably copolymers of ethylene and one or more $C_3$ to $C_{10}$, alpha-olefin comonomers and more preferably copolymers of ethylene and one or more comonomers selected from the group consisting of propylene, 1-butene, 1-hexene, 4-methyl-1-pentane, and 1-octene. Most preferably the copolymers are ethylene and 1-octene copolymers.

The density of these substantially linear ethylene polymers or linear ethylene polymers is equal to or greater than 0.850 grams per cubic centimeter (g/cm$^3$) and preferably equal to or greater than 0.860 g/cm$^3$. Generally, the density of these substantially linear ethylene polymers or linear ethylene polymers is less than or equal to about 0.93 g/cm$^3$ and preferably less than or equal to about 0.900 g/cm$^3$. The melt flow ratio for substantially linear ethylene polymers, measured as $I_{10}/I_2$, is greater than or equal to about 5.63, is preferably from about 6.5 to about 15, and is more preferably from about 7 to about 10. $I_2$ is measured according to ASTM Designation D 1238 using conditions of 190° C. and 2.16 kilogram (kg) mass. $I_{10}$ is measured according to ASTM Designation D 1238 using conditions of 190° C. and 10.0 kg mass.

The $M_w/M_n$ for substantially linear ethylene polymers is the weight average molecular weight ($M_w$) divided by number average molecular weight ($M_n$). $M_w$ and $M_n$ are measured by gel permeation chromatography (GPC). For substantially linear ethylene polymers, the $I_{10}/I_2$ ratio indicates the degree of long-chain branching, i.e. the larger the $I_{10}/I_2$ ratio, the more long-chain branching exists in the polymer. In preferred substantially linear ethylene polymers $M_w/M_n$ is related to $I_{10}/I_2$ by the equation: $M_w/M_n \leq (I_{10}/I_2) - 4.63$. Generally, $M_w/M_n$ for substantially linear ethylene polymers is at least about 1.5 and preferably at least about 2.0 and is less than or equal to about 3.5, more preferably less than or equal to about 3.0. In a most preferred embodiment, substantially linear ethylene polymers are also characterized by a single DSC melting peak.

The preferred $I_2$ melt index for these substantially linear ethylene polymers or linear ethylene polymers is from about 0.01 g/10 min to about 100 g/10 min, and more preferably about 0.1 g/10 min to about 10 g/10 min.

The preferred $M_w$ for these substantially linear ethylene polymers or linear ethylene polymers is equal to or less than about 180,000, preferably equal to or less than about 160,000, more preferably equal to or less than about 140,000 and most preferably equal to or less than about 120,000. The preferred $M_w$ for these substantially linear ethylene polymers or linear ethylene polymers is equal to or greater than about 40,000, preferably equal to or greater than about 50,000, more preferably equal to or greater than about 60,000, even more preferably equal to or greater than about 70,000, and most preferably equal to or greater than about 80,000.

The substantially linear ethylene polymer and/or linear ethylene polymer is employed in the thermoplastic polyolefin composition of the present invention in amounts sufficient to provide the desired balance of processability, heat resistance, and toughness. In general, the substantially linear ethylene polymer and/or linear ethylene polymer is employed in amounts of at least about 70 parts by weight, preferably at least about 75 parts by weight, more preferably at least about 80 parts by weight based on the weight of the total composition. In general, the substantially linear ethylene polymer and/or linear ethylene polymer is used in amounts less than or equal to about 95 parts by weight, preferably less than or equal to about 90 parts by weight, more preferably less than or equal to about 85 parts by weight based on the weight of the total composition.

Component (iii) in the thermoplastic polyolefin composition of the present invention is one or more propylene polymer, preferably a propylene polymer with a degree of crystallinity equal to or greater than 30 percent. The propylene polymer suitable for use in this invention is well known in the literature and can be prepared by known techniques. In general, the propylene polymer is in the isotactic form, although other forms can also be used (e.g., syndiotactic or atactic). The propylene polymer used for the present invention is preferably a homopolymer of polypropylene or more preferably a copolymer, for example, a random or block copolymer, of propylene and an alpha-olefin, preferably a $C_2$ or $C_4$ to $C_{20}$ alpha-olefin. The alpha-olefin is present in the propylene copolymer of the present invention in an amount of not more than 20 percent by mole, preferably not more than 15 percent, even more preferably not more than 10 percent, and most preferably not more than 5 percent by mole.

Examples of the $C_2$ and $C_4$ to $C_{20}$ alpha-olefins for constituting the propylene and alpha-olefin copolymer include ethylene, 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene, where alkyl branching position is not specified it is generally on position 3 or higher of the alkene.

The propylene polymer of the present invention can be prepared by various processes, for example, in a single stage or multiple stages, by such polymerization method as slurry polymerization, gas phase polymerization, bulk polymerization, solution polymerization or a combination thereof using a metallocene catalyst or a so-called Ziegler-Natta catalyst, which usually is one comprising a solid transition metal component comprising titanium. Particularly a catalyst consisting of, as a transition metal/solid component, a solid composition of titanium trichloride which contains as essential components titanium, magnesium and a halogen; as an organometallic component an organoaluminum compound; and if desired an electron donor. Preferred electron donors are organic compounds containing a nitrogen atom, a phosphorous atom, a sulfur atom, a silicon atom or a boron atom, and preferred are silicon compounds, ester compounds or ether compounds containing these atoms.

Polypropylene is commonly made by catalytically reacting propylene in a polymerization reactor with appropriate molecular weight control agents. Nucleating agent is added after the reaction is completed in order to promote crystal formation. The polymerization catalyst should have high activity and be capable of generating highly tactic polymer. The reactor system must be capable of removing the heat of polymerization from the reaction mass, so the temperature and pressure of the reaction can be controlled appropriately.

A good discussion of various polypropylene polymers is contained in *Modern Plastics Encyclopedia*/89, mid October 1988 Issue, Volume 65, Number 11, pp. 86-92, the entire disclosure of which is incorporated herein by reference. The molecular weight of the propylene polymer for use in the present invention is conveniently indicated using melt flow rate (MFR) or MI, according to ASTM D 1238 at 230° C. and an applied load of 2.16 kg. MFR is inversely proportional to the molecular weight of the polymer. Thus, the higher the molecular weight, the lower the melt flow rate, although the relationship is not linear. The MFR for the propylene polymer useful herein is generally greater than about 0.1 g/10 min, preferably greater than about 0.5 g/10 min, more preferably greater than about 1 g/10 min, and even more preferably greater than about 10 g/10 min The MFR for the propylene polymer useful herein is generally less than about 200 g/10 min, preferably less than about 100 g/10 min, more preferably less than about 75 g/10 min, and more preferably less than about 50 g/10 min.

The degree of crystallinity for suitable propylene polymer for use in the present invention is equal to or greater than 30 weight percent, preferably equal to or greater than 50 weight percent, preferably equal to or greater than 60 weight percent, more preferably equal to or greater than 65 weight percent, and even more preferably equal to or greater than 70 weight percent based on the weight of the propylene polymer. The degree of crystallinity for the propylene polymer suitable for use in the present invention is less than or equal to 100 weight percent, preferably less than or equal to 90 weight percent, more preferably less than or equal to 80 weight percent, and most preferably less than or equal to about 75 weight percent based on the weight of the propylene polymer.

Unless otherwise noted, the degree of crystallinity for the propylene polymer of the present invention is determined by the following DSC method. A small sample (milligram size) of the propylene polymer is sealed into an aluminum DSC pan. The sample is placed into a DSC cell with a 25 centimeter per minute nitrogen purge and cooled to about −100° C. A standard thermal history is established for the sample by heating at 10° C. per minute to 225° C. The sample is then cooled to about −100° C. and reheated at 10° C. per minute to 225° C. The observed heat of fusion ($\Delta H_{observed}$) for the second scan is recorded. The observed heat of fusion is related to the degree of crystallinity in weight percent based on the weight of the polypropylene sample by the following equation:

$$\text{Crystallinity, }\% = \frac{\Delta H_{observed}}{\Delta H_{isotactic\ PP}} \times 100$$

where the heat of fusion for isotactic polypropylene ($\Delta H_{isotactic\ PP}$), as reported in B. Wunderlich, Macromolecular Physics, Volume 3, Crystal Melting, Academic Press, New Your, 1980, p 48, is 165 J/g of polymer.

In one embodiment of the present invention, the propylene polymer is not graft modified.

In another embodiment of the present invention, part, or all, of the propylene polymer of the present invention may be graft modified. A preferred graft modification of the polypropylene is achieved with any unsaturated organic compound containing, in addition to at least one ethylenic unsaturation (e.g., at least one double bond), at least one carbonyl group (—C═O) and that will graft to a polypropylene as described above. Representative of unsaturated organic compounds that contain at least one carbonyl group are the carboxylic acids, anhydrides, esters and their salts, both metallic and nonmetallic. Preferably, the organic compound contains ethylenic unsaturation conjugated with a carbonyl group. Representative compounds include maleic, fumaric, acrylic, methacrylic, itaconic, crotonic, -methyl crotonic, and cinnamic acid and their anhydride, ester and salt derivatives, if any. Maleic anhydride is the preferred unsaturated organic compound containing at least one ethylenic unsaturation and at least one carbonyl group.

The unsaturated organic compound content of the grafted polypropylene is at least about 0.01 weight percent, preferably at least about 0.1 weight percent, more preferably at least about 0.5 weight percent, and most preferably at least about 1 weight percent based on the combined weight of the polypropylene and organic compound. The maximum amount of unsaturated organic compound content can vary to convenience, but typically it does not exceed about 10 weight percent, preferably it does not exceed about 5 weight percent, more preferably it does not exceed about 2 weight percent and most preferably it does not exceed about 1 weight percent based on the combined weight of the polypropylene and the organic compound.

The propylene polymer is employed in the thermoplastic polyolefin compositions of the present invention in amounts sufficient to provide the desired processability and good balance of stiffness and toughness. In general, the propylene polymer is employed in an amount of at least about 5 parts by weight, preferably at least about 10 parts by weight, more preferably at least about 15 parts by weight based on the weight of the total composition. In general, the propylene polymer is used in amounts less than or equal to about 30 parts by weight, preferably less than or equal to about 25 parts by weight, more preferably less than or equal to about 20 parts by weight based on the weight of the total composition.

The thermoplastic polyolefin composition of the present invention preferably has a density equal to or greater than 0.87, preferably equal to or greater than 0.875, more preferably equal to or greater than 0.88, more preferably equal to or greater than 0.885, more preferably equal to or greater than 0.89. The thermoplastic polyolefin composition of the present invention has a density equal to or less than 0.895 g/cc.

The thermoplastic polyolefin composition of the present invention preferably has a Shore A hardness equal to or greater than 75, preferably equal to or greater than 80, more preferably equal to or greater than 85, and more preferably equal to or greater than 90. The thermoplastic polyolefin composition of the present invention preferably has a Shore A hardness equal to or less than 95

The thermoplastic polyolefin composition of the present invention preferably has an $I_{10}/I_2$ equal to or less than 7, preferably equal to or less than 6.95, more preferably equal to or less than 6.9, more preferably equal to or less than 6.85, more preferably equal to or less than 6.8. The thermoplastic polyolefin composition of the present invention has an $M_w/M_n$ from equal to or greater than 1.3, preferably equal to or greater than 1.9, more preferably equal to or greater than 2, and even more preferably equal to or greater than 3.

The thermoplastic polyolefin composition of the present invention comprises a copolymer having a mol percent comonomer equal to or greater than 8, preferably equal to or greater than 9, more preferably equal to or greater than 9, and more preferably equal to or greater than 10. The thermoplastic polyolefin composition of the present invention comprises a copolymer having a mol percent equal to or less than 12.5, more preferably equal to or less than 12, more preferably equal to or less than 11.5, and most preferably equal to or less than 11.

The thermoplastic polyolefin composition of the present invention preferably has a soft segment content by weight percent equal to or less than 77.5, preferably equal to or less than 75, more preferably equal to or less than 72.5, more preferably equal to or less than 70, and more preferably equal to or less than 67.5. The thermoplastic polyolefin composition of the present invention preferably has a soft segment content by weight percent equal to or greater than 40, preferably equal to or greater than 50, more preferably equal to or greater than 60, and more preferably equal to or greater than 65.

The thermoplastic polyolefin composition of the present invention preferably has a hard segment content by weight percent equal to or less than 60, preferably equal to or less than 50, more preferably equal to or less than 40, and more preferably equal to or less than 35. The thermoplastic polyolefin composition of the present invention preferably has a hard segment content by weight percent equal to or greater than 22.5, preferably equal to or greater than 25, more preferably equal to or greater than 27.5, more preferably equal to or greater than 30, and more preferably equal to or greater than 32.5.

The thermoplastic polyolefin composition of the present invention preferably has a glass transition point ($T_g$) equal to or less than 0° C., preferably equal to or less than −25° C., more preferably equal to or less than −45° C., and more preferably equal to or less than −60° C. $T_g$ is the temperature or temperature range at which a polymeric material shows an abrupt change in its physical properties, including, for example, mechanical strength. $T_g$ can be determined by the DSC method described hereinabove.

The thermoplastic polyolefin composition of the present invention preferably has a melting peak ($T_m$) as determined by the hereindisclosed DSC method equal to or greater than 95° C., preferably equal to or greater than 100° C., more preferably equal to or greater than 105° C., more preferably equal to or greater than 110° C., more preferably equal to or greater than 115° C., and more preferably equal to or greater than 120° C.

The thermoplastic polyolefin composition of the present invention preferably has a heat of fusion as determined by the hereindisclosed DSC method equal to or greater than 40 J/g, preferably equal to or greater than 50 J/g, more preferably equal to or greater than 55 J/g, more preferably equal to or greater than 60 J/g, and more preferably equal to or greater than 70 J/g.

The thermoplastic polyolefin composition of the present invention preferably has a percent crystallinity as determined by the hereindisclosed DSC method equal to or greater than 19 percent, preferably equal to or greater than 20 percent, more preferably equal to or greater than 22 percent, more preferably equal to or greater than 25 percent, and more preferably equal to or greater than 30 percent.

The thermoplastic polyolefin composition of the present invention preferably has an $I_2$ melt index (190° C./2.16 kg) of equal to or less than 15 g/10 min, preferably equal to or less than 14 g/10 min, more preferably equal to or less than 12 g/10 min, and more preferably equal to or less than 10 g/10 min. The thermoplastic polyolefin composition of the present invention preferably has an $I_2$ melt index of equal to or greater than 0.01 g/10 min, preferably equal to or greater than 0.1 g/10 min, more preferably equal to or greater than 1 g/10 min, more preferably equal to or greater than 2.5 g/10 min, and more preferably equal to or greater than 5 g/10/min.

The thermoplastic polyolefin composition of the present invention preferably has an $I_{10}$ melt index (190° C./10 kg) of equal to or less than 100 g/10 min, preferably equal to or less than 90 g/10 min, more preferably equal to or less than 80 g/10 min, and more preferably equal to or less than 75 g/10 min. The thermoplastic polyolefin composition of the present invention preferably has an $I_{10}$ melt index of equal to or greater than 1 g/10 min, preferably equal to or greater than 5 g/10 min, more preferably equal to or greater than 10 g/10 min, more preferably equal to or greater than 15 g/10 min, and more preferably equal to or greater than 20 g/10/min.

Optionally, the thermoplastic polyolefin composition of the present invention may comprise a filler such as calcium carbonate, talc, clay, mica, wollastonite, hollow glass beads, titaninum oxide, silica, carbon black, glass fiber or potassium titanate. Preferred fillers are talc, wollastonite, clay, single layers of a cation exchanging layered silicate material or mixtures thereof. Talcs, wollastonites, and clays are generally known fillers for various polymeric resins. See for example U.S. Pat. Nos. 5,091,461 and 3,424,703; EP 639,613 A1; and EP 391,413, where these materials and their suitability as filler for polymeric resins are generally described.

Fillers may be employed to obtain optimized combinations of toughness and stiffness in the propylene polymer compositions according to the present invention. If present, the filler is employed in an amount of at least about 1 part by weight, preferably at least about 3 parts by weight, more preferably at least about 5 parts by weight, even more preferably at least about 10 parts by weight, and most preferably at least about 15 parts by weight based on the total weight of the composition. Usually it has been found sufficient to employ an amount of filler up to and including about 50 parts by weight, preferably up to and including about 40 parts by weight, more preferably up to and including about 30 parts by weight, more preferably up to and including about 25 parts by weight, more preferably up to and including about 20 parts by weight, and most preferably up to and including about 15 parts by weight based the total weight of the composition.

Optionally, the thermoplastic polyolefin composition of the present invention my further comprises an additional polymer which is a resin other than components (i), (ii), and (iii) above. Preferred additional polymers are polyethylene, preferably low density polyethylene (LDPE), linear low density polyethylene (LLDPE), and high density polyethylene (HDPE), polystyrene, polycyclohexylethane, polyesters, such as polyethylene terephthalate, ethylene/styrene interpolymers, syndiotactic PP, syndiotactic PS, ethylene/propylene copolymers (EP), ethylene/propylene/diene terpolymer (EPDM), and mixtures thereof.

If present, the additional polymer is employed in amounts of equal to or greater than about 1 part by weight, preferably equal to or greater than about 3 parts by weight, more preferably equal to or greater than about 5 parts by weight, and most preferably equal to or greater than about 7 parts by weight based on the weight of the thermoplastic polyolefin composition. In general, the additional polymer is used in amounts less than or equal to about 40 parts by weight, preferably less than or equal to about 20 parts by weight, more preferably less than or equal to about 15 parts by weight, more preferably less than or equal to about 10 parts by weight, and most preferably less than or equal to about 8 parts by weight based on the weight of the thermoplastic polyolefin composition.

The claimed thermoplastic polyolefin compositions of the present invention may also optionally contain one or more additives that are commonly used in thermoplastic polyolefin compositions of this type. For example a slip agent, preferred slip agents are a saturated fatty acid amide or ethylenebis (amide), an unsaturated fatty acid amide or ethylenebis(amide) or combinations thereof. Other optional additives include, but are not limited to: ignition resistant additives, stabilizers, colorants, pigments, antioxidants, antistats, flow enhancers, mold releases, such as metal stearates (e.g., calcium stearate, magnesium stearate), nucleating agents, including clarifying agents, etc. Preferred examples of additives are ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least about 0.01 parts, preferably at least about 0.1 parts, more preferably at least about 1 parts, more preferably at least about 2 parts and most preferably at least about 5 parts by weight based on the total weight of the composition. Generally, the additive is present in an amount less than or equal to about 25 parts, preferably less than or equal to about 20 parts, more preferably less than or equal to about 15 parts, more preferably less than or equal to about 12 parts, and most preferably less than or equal to about 10 parts by weight based on the total weight of composition.

Preparation of the thermoplastic polyolefin compositions of this invention can be accomplished by any suitable mixing means known in the art, including being prepared in a reactor, powder-powder blending, or preferably dry blending the individual components, and subsequently melt mixing (e.g., using a Banbury mixer, an extruder, roll mill, etc.). The melt blended thermoplastic polyolefin may be converted directly to a powder or first comminuted to pellets then pulverized into a powder.

Typically, the solid thermoplastic composition of the present invention is available from bags, gaylords, bulk bins, rail cars, and/or silos in the form of pellets or sometimes powder. The thermoplastic polyolefin composition of the present invention is pulverized, ground, or milled for use in a paper transfer process, preferably at ambient temperature. Grinding may occur under ambient atmosphere, e.g., air or under an inert atmosphere such as nitrogen. Further, grinding may occur under ambient pressure, under positive pressure, or under negative pressure. Pellets are transported, from for example their bulk storage, to a feed hopper and fed into the grinding equipment, often the feed is facilitated by a vibration feeder or the like. Any suitable pulverization equipment know in the art is applicable, for example using an attrition mill, a disk mill, a turbo mill, a pin mill, a vertical mill, a linlex mill, a hammer mill, a conical mill, a ball mill, a rod mill, a cutting mill such as a Wiley mill, a powder grinder, and the like. For a good description of some of these mills see US Publication No. 2004/0147680. The ground particulate, or powder, is separated by size via a cyclone, screens, sifters, sieves, rotary gates, or combinations thereof. If necessary, material that is too coarse is recycled through the hopper, feeder, and grinding equipment. The powder is collected, for example in a finished product hopper, and used directly in the paper transfer step or packaged into an appropriate container such as a bag or bulk bin.

The grinding of solid thermoplastic composition of the present invention occurs under exposure of mechanical forces which breakup the structure by overcoming of the interior bonding forces. After the grinding the state of the solid is changed and may be characterized by one or more of its particle size, its average particle size, its particle size distribution, and/or its particle shape. Thermoplastic compositions for use in the paper transfer process of the present invention are preferably characterized by having a particle size of from about 150 microns to about 600 microns, preferably of from about 200 microns to about 425 microns. Preferably, 50 weight percent or more of the particles are within the particle size range of from about 200 microns to about 425 microns, more preferably 75 weight percent or more of the particles are within the particle size range of from about 200 microns to about 425 microns, and even more preferably 85 weight percent or more are within the particle size range of from 200 microns to about 425 microns. Alternatively, the ground particles have a weight average particle size between about 200 microns to about 425 microns, more preferably of from about 250 microns to about 350 microns, and even more preferably of from about 275 microns to about 325 microns.

In one embodiment, the powdered thermoplastic polyolefin composition of the present invention is used to make an artificial leather. The artificial leather may be unsupported (no additional backing, i.e., for skin type applications) or supported by its application to a base layer, such as a fabric (for upholster type applications). The artificial leather according to the present invention comprises a resin layer formed of the above-described thermoplastic polyolefin composition on at least one side of a release paper. No particular limitation is imposed on the release paper, and release papers which have been used for the production of artificial leather to date are all usable.

In one embodiment, the present invention comprises a process to make a coated release paper having a single continuous polymeric layer of the thermoplastic polyolefin composition of the present invention. The process comprises the steps of (i) preparing a first powdered coating formulation by using, as an essential component, the thermoplastic polyolefin composition in powder form disclosed herein above and, if desired, one or more of the various additives commonly used for such compositions, such dyes, pigments, fillers, plasticizers, stabilizers, surfactants, age resisters, blowing agents, and the like, as needed, (ii) coating the first powdered coating formulation onto the first surface of the release paper having a first and a second surface, by any suitable method, preferably spray coating, to the desired thickness and/or density, and then (iii) heating the thus-applied coating formulation and melting or fusing the powder to form a first continuous polymeric layer having a first and a second surface wherein the first surface of the first continuous polymeric layer is applied to the first surface of the release paper.

In another embodiment, the present invention comprises a process to make a multi layered coated release paper wherein the first layer comprises the first continuous polymeric layer as herein above. A second continuous polymeric layer is applied to the second surface of the first continuous polymeric layer by (iv) preparing a second powdered coating formulation, preferably by using, as an essential component, the thermoplastic polyolefin composition in powder form disclosed herein above and, if desired, one or more of the various additives commonly used for such compositions, such dyes, pigments, fillers, plasticizers, stabilizers, surfactants, age resisters, blowing agents, and the like, as needed, wherein the second powdered coating formulation is different from the first powdered coating formulation, (v) coating the second powdered coating formulation onto a second surface of the first continuous polymeric layer, by any suitable method, preferably spray coating, to the desired thickness and/or density, and then (vi) heating the thus-applied second coating formulation to form a second continuous polymeric layer.

Preferably the second coating formulation comprises a blowing agent, which when activated will generate a gas or mixtures of gasses which will induce foaming in the second coating formulation to produce a second continuous polymeric foam layer comprising a cellular structure. Azodicarbonamide "azo" is a preferred blowing agent alone or in combination with a salt of aluminum, potassium, zinc, barium, or mixtures thereof. The salt helps to regulate at what temperature the azo is activated to generate the gas(es) that foams the polymer to the desired thickness and or density reduction.

When the release paper is separated from its coating, it yields an unsupported artificial leather in the form of a polymeric sheet that is useful as a free-standing material or skin (unsupported artificial leather). Thickness of the sheet can range from 0.1 mm to 3 mm. When the coated surface of the release paper is smooth, the adjacent surface of the artificial leather is smooth when the release paper is stripped away. Preferably the coated surface of the release paper has a pattern that provides an embossed or a grain pattern on the surface of the artificial leather when stripped away. Such embossed sheet has excellent grain retention and thus has particular use in simulated leather applications. Said skin may further be laminated or bonded to another structure such as a molded plastic article by any suitable means, such as back injection molding, with adhesives or as upholstery replacing leather or PVC leather-look.

In another embodiment of the present invention, the coated release paper is applied to a fabric to provide a supported artificial leather. Suitable fabrics can be woven, non-woven, knitted, twilled, sweating, or the like. The base fabric is piled on the continuous polymeric layer surface of a mono- or multiple-layer coated release paper to form a coated release paper/fabric composite sheet. Impregnating the fabric with the polymer is achieved by passing the composite sheet through a heat source at a fixed temperature and humidity and/or applying pressure to the heated composite sheet to provide a fused composite sheet. Commonly, pressure is achieved by passing the heated composite sheet between two rollers having a fixed space or between two rollers to which a fixed pressure is given. The rolls may or may not be heated as needed. The fused composite sheet is cooled and the release paper is stripped off to provide a fabric supported artificial leather.

The artificial leathers thus obtained have excellent touch, appearance and full-hand similar to that of natural leather and further has excellent softness and surface strength. The present artificial leather according to the present invention are useful as skins or covers for products in the following fields: (i) in the automobile fields, for example, various automobile parts including interior skin or cover materials of, for example, seats, instrument panels, console boxes, arm rests, head rests, door trims, rear panels, pillar trims, sunvisors, trunk room trims, trunk lid trims, air bag covers, seat buckles, head liners, gloves boxes and steering wheel covers; interior molded articles of, for example, kicking plates and change lever boots; exterior parts of, for example, spoilers, side moles, number plate housings, mirror housings, air dam skirt and mud guards; and other molded articles of automobile parts; (ii) in the sport good fields, ball covers, sport shoe uppers, grips of rackets, sport tools and goods of various ball games, covering materials of saddles and handlebar grips of bicycles, motor-cycles and tricycles, etc.; (iii) in the housing and building fields, covering materials of upholstery for furniture, chairs, etc., wall decorative materials, covering materials of curtain walls, table cloths, placemats, coasters, ash tray doilies, (iv) in the industrial part field, grips and hoses for electric tools, etc., and the covering materials thereof, and (v) in other fields, covering materials of bags, briefcases, cases, handbags, shoe uppers, clothes, files, pocket books, albums, stationary, toys, and molded articles such as watch bands, outer frames of picture or photograph and their covering materials.

EXAMPLES

"OBC" is an ethylene-octene block copolymer having an $I_2$ melt index (190° C./2.16 kg) of 5 g/10 min, an $I_{10}$ melt index (190° C./10 kg) of 35 g/10 min, a density of 0.887 g/cc, a percent hard segment of 33, a $T_g$ of −54° C., a melting peak of 120° C. as determined by DSC, a crystallinity of 25 percent, a heat of fusion of 73 J/g, and a Shore A hardness of 85. The properties of OBC are summarized in Table 1. The OBC is colored black, gray, and beige.

The OBC samples are ground continuously at ambient temperature using a disk mill. Pellets are pneumatically transported to a feed hopper and into the disk mill via a vibration feeder, in which the feed rate is controlled by a temperature set point of the disk mill. After grinding, a fan blows the powder into a cyclone with a rotary valve which directs the powder to the top screen of a multi-screen sifter. Coarse and fine powder is separated and the coarse powder is recycled back to the feed hopper and the fine powder is collected and packaged into bags or bulk bins. Rates of about 100 to 150 kilogram per hour (kg/hr) are achieved. The fine powder has a weight average particle size of about 300 microns with about 85 weight percent of the fine powder having a particle size within the range of 200 microns to 450 microns and a bulk density powder of 300 grams per liter (g/l).

Examples 1 to 6 are the three colors of OBC applied to two different release papers. The two release papers are High-tem 900 Torito (Gloss 60°=13) from Wiggins paper and Bor Supermatt (Gloss 60°=2.1) from Sappi which surface is exactly reproduced after powder coating with OBC colored powders. The OBC samples are powdered sprayed onto the release papers using a powder spray machine at a thickness of 250-430 grams per square meter (g/m²), the OBC powder coated release papers are heated with IR lamps to about 150° C. with infra red heat lamps and then covered with non woven textile. The textile has a density of 100-200 g/m² and is combined under pressure with the molten OBC sheet on release paper to obtain even thickness of the combined release paper/OBC/textile. After cooling, the release paper is stripped off providing coated fabrics is obtained using three types of different release papers resulting in three different types of finish and haptics. The surface of the three release papers used is exactly copied and resulted in an artificial leather, smooth surface, and second smooth surface. The touch and feel also reflected the type of paper used. The artificial leather surface is not tacky the smooth surfaces are silky. In all Examples, the artificial leather can not be separated from the textile. The surfaces of the 3 tested transfer papers are exactly copied onto all three of the colored OBC surfaces.

TABLE 1

| PROPERTY | OBC-1 |
|---|---|
| TPO Composition | |
| Melt Index, g/min | |
| $I_2$ @ 190° C./2.16 kg | 5 |
| $I_{10}$ @ 190° C./10 kg | 35 |
| Density, g/cc | 0.887 |
| Hard Segment, % | 33 |
| $T_g$, ° C. | −54 |
| Melting Peak, ° C. | 120 |
| % Crystallinity, % | 25 |
| Heat of Fusion, J/g | 73 |
| Shore A Hardness | 85 |
| Particle Size, wt % | |
| 200-425 microns | >85 |
| Paper Powder coating Examples 1-6 | |
| Gloss 60 - High-tem 900 Torito | 9. to 12.0 |
| Gloss 60 - Bor Supermatt | 1.0 to 2.0 |
| Balli Flex DIN 53359 | >250.000 no surface damage |

The invention claimed is:

1. A process for the production of a supported artificial leather comprising the steps of:
   (a) forming a thermoplastic polyolefin composition into a powder, said composition comprising:
      (i) an olefin block copolymer, having:
         (i)(1) a Shore A hardness greater than 75,
         (i)(2) a Tg less than −45° C.,
         and
         (i)(3) a distinct melting peak greater than 95° C. as determined by DSC
      or
      (ii) a blend of:
         (ii)(1) a linear ethylene polymer, a substantially linear ethylene polymer, or mixtures thereof characterized as having:
            (ii)(1)(a) a density of less than about 0.93 g/cm³,
            (ii)(1)(b) a molecular weight distribution, $M_w/M_n$, of less than about 3.0,
            and
            (ii)(1)(c) a Composition Distribution Branch Index of greater than 30 percent,
         and
         (ii)(2) a propylene polymer having a crystallinity equal to or greater than 30 percent
   (b) coating a release paper with said powder,
   (c) heating said coating to form a continuous polymeric layer,
   (d) applying a fabric to heated continuous polymeric layer forming a fabric/polymeric layer composite,
   (e) applying pressure to the heated fabric/polymeric layer composite,
   (f) cooling said fabric/polymeric composite layer, and
   (g) stripping the release paper from the continuous polymeric layer forming an artificial leather.

2. A process for the production of an unsupported artificial leather comprising the steps of:
   (a) forming a thermoplastic polyolefin composition into a powder, said composition comprising:
      (i) an olefin block copolymer, having:
         (i)(1) a Shore A hardness greater than 75,
         (i)(2) a Tg less than −45° C.,
         and
         (i)(3) a distinct melting peak greater than 95° C. as determined by DSC
      or (ii) a blend of:
  (ii)(1) a linear ethylene polymer, a substantially linear ethylene polymer, or mixtures thereof characterized as having:
    (ii)(1)(a) a density of less than about 0.93 g/cm$^3$,
    (ii)(1)(b) a molecular weight distribution, $M_w/M_n$, of less than about 3.0, and
    (ii)(1)(c) a Composition Distribution Branch Index of greater than 30 percent, and
  (ii)(2) a propylene polymer having a crystallinity equal to or greater than 30 percent
(b) coating a release paper with said powder,
(c) heating said coating to form a continuous polymeric layer,
(f) cooling said polymeric layer, and
(g) stripping the release paper from the continuous polymeric layer forming an artificial leather.

3. The process of claims 1 or 2 wherein the
(i) olefin block copolymer is further characterized by one or more of the aspects described as follows:
  (i.a) has a weight average molecular weight/number average molecular weight ratio (Mw/Mn) from about 1.7 to about 3.5, at least one melting peak (Tm) in degrees Celsius, and a density (d) in grams/cubic centimeter (g/cc), wherein the numerical values of Tm and d correspond to the relationship:

$$T_m > -2002.9 + 4538.5(d) - 2422.2(d)^2 \text{ or } T_m > -6553.3 + 13735(d) - 7051.7(d)^2; \text{ or}$$

(i.b) has a Mw/Mn from about 1.7 to about 3.5, and is characterized by a heat of fusion ($\Delta H$) J/g and a delta quantity, $\Delta T$, in degrees Celsius defined as the temperature difference between the tallest differential scanning calorimetry (DSC) peak and the tallest crystallization analysis fractionation (CRYSTAF) peak, wherein the numerical values of $\Delta T$ and $\Delta H$ have the following relationships:

$$\Delta T > -0.1299(\Delta H) + 62.81 \text{ for } \Delta H \text{ greater than zero and up to } 130 \text{ J/g},$$

$$\Delta T \geq 48°\text{ C. for } \Delta H \text{ greater than } 130 \text{ J/g},$$

wherein the CRYSTAF peak is determined using at least 5 percent of the cumulative polymer, and if less than 5 percent of the polymer has an identifiable CRYSTAF peak, then the CRYSTAF temperature is 30° C.; or (i.c) is characterized by an elastic recovery (Re) in percent at 300 percent strain and 1 cycle measured with a compression-molded film of the ethylene/alpha-olefin interpolymer, and has a density (d) in grams/cubic centimeter (g/cc), wherein the numerical values of Re and d satisfy the following relationship when ethylene/alpha-olefin interpolymer is substantially free of a cross-linked phase: Re>1481-1629(d); or (i.d) has a molecular fraction which elutes between 40° C. and 130° C. when fractionated using TREF, characterized in that the fraction has a molar comonomer content greater than, or equal to, the quantity (−0.2013) T+20.07, more preferably greater than or equal to the quantity (−0.2013) T+21.07, where T is the numerical value of the peak elution temperature of the TREF fraction, measured in ° C.; or (i.e) has a storage modulus at 25° C. (G'(25° C.)) and a storage modulus at 100° C. (G'(100° C.)) wherein the ratio of G'(25° C.) to G'(100° C.) is in the range of about 1:1 to about 9:1 or (i.f) has a molecular fraction which elutes between 40° C. and 130° C. when fractionated using TREF, characterized in that the fraction has a block index of at least 0.5 and up to about 1 and a molecular weight distribution, Mw/Mn, greater than about 1.3; or (i.g) has an average block index greater than zero and up to about 1.0 and a molecular weight distribution, Mw/Mn, greater than about 1.3.

4. The process of claim 1 or 2 wherein the thermoplastic polyolefin composition is formed into a powder by pulverizing said thermoplastic polyolefin composition at ambient temperature.

5. The process of claim 2 wherein the unsupported artificial leather is used as a skin for an instrument panel, a console box, an arm rest, a head rest, a door trim, a rear panel, a pillar trim, a sunvisor, a trunk room trim, a trunk lid trim, an air bag cover, a seat buckle, a head liner, a gloves box, or a steering wheel cover.

6. The process of claim 1 wherein the supported artificial leather is used as a skin for an instrument panel, a console box, an arm rest, a head rest, a door trim, a rear panel, a pillar trim, a sunvisor, a trunk room trim, a trunk lid trim, an air bag cover, a seat buckle, a head liner, a gloves box, or a steering wheel cover.

* * * * *